(12) United States Patent
Fuqua (10) Patent No.: US 7,278,373 B2
(45) Date of Patent: Oct. 9, 2007

(54) METHOD OF HERD MANAGEMENT

(76) Inventor: James Fuqua, 683 Lazy U Ranch Rd., Quanah, TX (US) 79252-8076

( * ) Notice: Subject to any disclaimer, the term of this patent is extended or adjusted under 35 U.S.C. 154(b) by 51 days.

(21) Appl. No.: 10/060,616

(22) Filed: Jan. 30, 2002

(65) Prior Publication Data

US 2003/0140865 A1    Jul. 31, 2003

(51) Int. Cl.
*A01K 29/00* (2006.01)
(52) U.S. Cl. .................................................. 119/174
(58) Field of Classification Search ............... None
See application file for complete search history.

(56) References Cited

U.S. PATENT DOCUMENTS

| | | | |
|---|---|---|---|
| 4,280,448 A | | 7/1981 | Ostermann |
| 4,288,856 A | * | 9/1981 | Linseth ..................... 119/841 |
| 4,617,876 A | * | 10/1986 | Hayes ........................ 119/842 |
| 4,745,472 A | | 5/1988 | Hayes |
| 4,939,574 A | | 7/1990 | Peterson et al. |
| 5,194,036 A | | 3/1993 | Chevalier et al. |
| 5,351,644 A | | 10/1994 | Everett |
| 5,457,627 A | | 10/1995 | Cureton et al. |
| 5,673,647 A | * | 10/1997 | Pratt ........................ 119/51.02 |
| 5,803,906 A | * | 9/1998 | Pratt et al. .................. 600/300 |
| 5,878,402 A | | 3/1999 | Brewster et al. |
| 6,000,361 A | | 12/1999 | Pratt |
| 6,135,055 A | | 10/2000 | Pratt |
| 6,318,289 B1 | * | 11/2001 | Pratt ........................ 119/51.02 |
| 6,664,897 B2 | * | 12/2003 | Pape et al. ................. 340/573.3 |

* cited by examiner

*Primary Examiner*—Thomas Price
(74) *Attorney, Agent, or Firm*—David W. Carstens; Carstens & Cahoon, LLP (57) ABSTRACT

A method and system to generate the highest level of return on investment of a cattle ranch producing beef to the consumer. Through the use of computer software integrated with an individual cow and calf identification system, the method and system disclosed herein allows a cattle producer to analyze the yearly production characteristics of each individual cow's calf or calves through all the various phases of growth and production with an accumulation of the economic cost and gain of value up to the end product as a feeder or cull.

The total value of the carcass at the end of production, expressed as a sum of the costs associated with producing each animal minus the market value of the animal, allows the animal's economic value to be expressed by one figure which can then be used to judge the cow's ability to produce animals that meet all predetermined economically important genetic traits. This system and method of cow herd management provides a continuing improvement in the efficiency of the ranching operation and a better product for the consumers.

22 Claims, 10 Drawing Sheets

Individual Cow Identification Data 102

CA= Cattlemaster or Equivalent
ML= IBR/P13/BVD+ Past

2000 Black

| Cow Tag # | Cow EID Ear Tag # | Retag #(s) | Cow Owner: | Cow DATE WORKED | Cow Weight | Comments: Location: | Service Yr. |
|---|---|---|---|---|---|---|---|
| 255 | A 00000 0 982 000003714701 | | Lazy U | 5/29/2000 | 894 | Big/West Past. | Jan-97 |

Calf 102 to Feeder 105 Individual Vaccination Data and Weaning Data

Vaccination Date:

| Vac TYPE | Vac Lot Number | DATE VAC | Vac TYPE | Vac Lot Number | DATE VAC | Weaning Weight | Date Weaned. | % Cows Body Wt. |
|---|---|---|---|---|---|---|---|---|
| CA | sn1821882901/183629090; cn 19007717b Exp 09/19/00 Vision 7 with Spur sn 188103 Exp | 2/24/02 | ML | Ft. Dodge; Pyramid 9 Ser.#191228A; 2166C: Exp. 6/9/00 | 5/30/2000 | | | |
| | | | | | 10/9/2000 | 440.00 | 10/9/2000 | 49.2% |

Individual Calf Identification Data 104

| Calf Data | Steers | Hfs. | Heifer |
| --- | --- | --- | --- |
| | EID# | EID# | EID# |
| St. 2000 | 2000 | 2000 | A 00000 0 982 |
| | | 1513 | 00000 371 7837 |
| 340 | 342 | 344 | 346 |

FIG. 3C

Feeder Calf 105 Shipping Data

| Shipping Weight | Shipping Date | Gain @ Stocker | Feedlot Location |
| --- | --- | --- | --- |
| 746.00 | 3/2/2001 | 306.00 | Flintrock |
| 350 | 352 | 354 | 356 |

FIG. 3D

Carcass Phase 112 Data Returned

Actual Carcass Data:

| DOF | Feed In Wt. | Feed Out Wt. | Hot Carcass Wt. | ADG | D % | REA | Back Fat | KPH Fat | Yield Grade | Marbling Score |
| --- | --- | --- | --- | --- | --- | --- | --- | --- | --- | --- |
| 195 | 471 | 1053.5433 | 669 | 2.9874016 | 0.64 | 12.5 | 0.56 | 2.5 | 2.9 | Sm10 |
| 360 | 362 | 364 | 368 | 370 | 372 | 374 | 376 | 378 | 380 | 382 |

FIG. 3E

Carcass Summary Data Sheet Dumas Plant Lot #224

| GRADE | YG | HEAD | WEIGHT | Av Car Wt | COST/CWT | TOTAL $ |
|---|---|---|---|---|---|---|
| Prime | 1 | | | | $132.91 | |
| Prime | 2 | 2 | 1273 | 636.50 | $130.91 | $1,666.48 |
| Prime | 3 | 4 | 2637 | 659.25 | $127.91 | $3,372.99 |
| Prime | 4 | | | | $107.91 | |
| Prime | 5 | | | | $102.91 | |
| Choice | 1 | 4 | 2571 | 642.72 | $124.91 | $3,211.44 |
| Choice | 2 | 34 | 22566 | 663.71 | $122.91 | $27,735.87 |
| Choice | 3 | 29 | 18486 | 637.45 | $119.91 | $22,166.56 |
| Choice | 4 | | | | $99.91 | |
| Choice | 5 | | | | $94.91 | |
| Select | 1 | | | | $105.43 | |
| Select | 2 | 3 | 1994 | 664.67 | $105.43 | $2,102.27 |
| Select | 3 | 1 | 659 | 659.00 | $105.43 | $694.78 |
| Select | 4 | | | | $85.43 | |
| Select | 5 | | | | $80.43 | |
| CAB | 1 | | | | $128.91 | |
| CAB | 2 | 8 | 5413 | 676.63 | $126.91 | $6,869.64 |
| CAB | 3 | 27 | 17628 | 652.89 | $123.91 | $21,842.85 |
| Heavy Choice | | | | | $99.91 | |
| Heavy Select | | | | | $85.43 | |
| Light Choice | | 4 | 2068 | 517.00 | $99.91 | $2,066.14 |
| Light Select | | | | | $85.43 | |
| Standard | | | | | $85.43 | |
| Commercials | | | | | $85.43 | |
| Utility/Canner | | | | | $40.00 | |
| Darks | | | | | $82.18 | |
| Totals | | 116 | 75295 | 649.09 | | $91,729.03 |

FIG. 4A

| Av Live Wt. | 1021 |
|---|---|
| Av Hot Wt. | 649 |
| Dressing % | 63.57% |
| Total # heifers | 116 |
| % CAB | 30.17% |

| % Prime | 5.17% |
|---|---|
| % Choice | 91.38% |
| % Select | 3.45% |
| % Stand | 0% |
| % Other | 0% |

| % YG1 | 3.45% |
|---|---|
| % YG2 | 41.38% |
| % YG3 | 55.17% |
| % YG4 | 0% |
| % YG5 | 0% |

| Live Price | $71.92 |
|---|---|
| Plant Dress% | 64.11% |
| Carcass Price | $112.18 |

Choice Yield Grade Prices
| YG 1 | $5.00 | YG 4 | $20.00 |
|---|---|---|---|
| YG 2 | $3.00 | YG 5 | $25.00 |
| YG 3 | $0 | | |

Choice base 46.65%   Muscle score 3.78

| Prime/Choice Spread | $8.00 |
|---|---|
| CAB/Choice Spread | $4.00 |
| Choice/Select Spread | $14.46 |
| Select/Standard Spread | $20.00 |

| Heavy & Light Discount | $12.27 |
|---|---|
| Dark Cutter Discount | $30.00 |

METHOD OF HERD MANAGEMENT

BACKGROUND OF THE INVENTION

1. Technical Field

The present invention relates generally to the management of cattle for varying market needs such as quality, food safety, and the consistent improvement of beef quality for one or more target markets. More specifically, the invention relates to the methods and processes for analyzing and improving the carcass value of beef cattle for the production of beef for human consumption by identifying, measuring, sorting and tracking animals individually and grouping animals into specific market groups for increased value and consistency with in each group. This process allows duplication of results by tracking performance at multiple levels and tracing results back to the base genetic lines of individual animals allowing the selection from that genetic pool for specific traits relating to marketing goals.

2. Description of Related Art

A working cattle ranch is a very complex operation and it is where the genetic makeup and processing management for individual animals are set and cannot be changed by natural means. It is the genetic blueprint that determines all the different attributes of the individual calf from the time of conception to the final destination in life.

The rancher today does not have to give up ownership when the calves leave his or her ranch or control. Through retained ownership interests, it is possible to cultivate and develop the end product before selling the calves at one or more marketing points to one or more market targets. It is in this concept that this invention was developed for and designed to implement. It also provides the flexibility for the rancher to take advantage of all situations and know his or her margin of profit at any time in the production chain for differing markets. This information allows the rancher to be able to determine the optimum time and market to sell the beef calves.

There are many genetic and processing principals that will enhance the weight of an animal or improve its rate of gain and/or economic efficiency, and overall market desirability and consistency. Hybrid vigor is one such method where two genetic lines are crossed to produce an F1 Cross. This F1 cross can be created by two different bloodlines within or between breed types of cattle. These methods are primarily designed to improve animal weight, but pay little or no attention to other factors such as, economic efficiency, processing and feeding environments, or the ability to replicate the targeted market traits and reduce the non-targeted market traits with any consistency.

The historical use of multiple cattle breeds and cross breeding has resulted in a very diverse beef cattle population with variable eating qualities such as tenderness, taste, fat content, size of cut as well as many other factors. The beef cattle industry is constantly changing at ever increasing rates, due to consumer demands, food safety and other issues. Although some may disagree, cattle producers are in the food business, in contrast to the ranching business. Meat competes with other sources of protein available on the market, some of which are less expensive compared to the cost of beef. Beef is a very "elastic" commodity, or in other words, is sometimes called a luxury type item. With this in mind, this translates to the higher consistent quality being the true goal of each market group. In plain terms, when people purchase or order a steak, they expect to have an enjoyable eating experience. A recent national survey showed that twenty percent of the time consumers do not have an enjoyable steak dining experience, in part due to poor quality beef. Poor quality may arise from a number of many different factors, one being the failure for the product to be of consistent quality within the market group targeted. (I.e.: not all United States Department of Agriculture grade "Choice" steaks have the same taste, tenderness or cutting qualities.) However, the largest failure is lack of ability to identify, track, sort, and replicate the better quality cattle consistently for specific markets.

Until, recently there was little incentive for the rancher or cattle producer to spend time tracking data needed for different markets. Only in very recent years has the long-term practice of buying cattle on the average cash market been curtailed. Until now, the practice of purchasing cattle on the average cash market allowed undesirable types of cattle to sell for a premium at the expense of the more desirable beef quality types of cattle. In other words, the beef packer buyer bought a large number of cattle based on the average value of the cattle he or she purchases. The only cattle priced correctly were the average cattle. The poor quality cattle received a premium price, greater than their true carcass value, and the higher quality cattle were discounted to make up the losses in the lower quality cattle. This practice encouraged cattle producers to do less than an adequate job in the selection of genetic resources for the cattle herd on the ranch. In fact, the cheapest cattle the cattle producer could raise brought the highest premium for its quality. The net result of this type of production and buying practices resulted in a steady decline in the consumption (market share) of beef by the consumer for the last twenty-five years.

In the mid to late 1990's cattle markets began to significantly change. Beef packing companies began to purchase greater numbers of cattle on a formula basis, and thus began to control via contract greater numbers of available slaughter cattle population. The formula basis was a new way of purchasing cattle from owners. In the past, cattle purchases were on a cash average basis and all cattle needed for the week were normally traded in the first two days of the week setting the price for the rest of the week. The formula basis, however, caused cattle producers to sell their beef with discounts for undesirable market traits in the carcass, and premiums for desirable market traits. The large change came when beef packing plants had enough contracted formula cattle and therefore did not need to purchase cash average basis cattle. This results in a severe cash price market drop when few cattle are needed on the cash market. Today, the average cash market is rarely used except when no other means is available for the seller of the cattle. Market participants have now created a cattle market based on the value of the processed product the consumer demands.

Cattle producers must now consider and determine the end product value of the cattle they produce. Fortunately, technological improvements in live animal carcass evaluation are in prominent use today. For example, U.S. Pat. No. 4,745,472 (Hayes), which issued May 17, 1988 and others have proposed ways to accurately measure and collect data on an animal's physical dimensions and weight by using video imaging techniques. Similarly, ultrasound back fat measurements of cattle is known in the art from the work of Professor John Brethour of Kansas State University's Fort Hayes Experimental Station, as explained in an article entitled "Cattle Sorting Enters a New Age" appearing at pages 1-5 and 8 of the September, 1994 issue of D.J. FEEDER MANAGEMENT. Professor Brethour has used the data from such measurements to project and estimated optimum shipping or end date (OED) for the measured animals. Also, various methods of sorting and weighing cattle have been known or proposed, as disclosed, for example, in U.S. Pat. No. 4,288,856 (Linseth) and U.S. Pat. No. 4,280,448 (Ostermann). Cattle Scanning Systems of Rapid City, S. Dak., markets a computerized video imaging and sorting system that includes weighing and scanning external dimensions of each animal, assigning a frame score and muscle score to the animal based on such dimensions, calculating a predicted optimal end weight and marketing date from the composite score and current weight data, and then sorting the animals for feeding according to their optimal marketing dates. Feedlots across the country are equipped with ultrasound machines that identify cattle electronically and measure cattle ribeye size, back fat thickness and marbling scores before the animal is processed.

The characteristics of calves are now measured earlier based on carcass quality for the market goals of the producer. Cattle with high beef quality will have a consistent market in the future where lower beef quality will be discounted or not purchased at all depending on demand. There are many different systems for the rancher to acquire data that will guide in decision making for the producer. Some measure yearling weights and concentrate on weaned weight of calves, some measure probability of gains at feedlots, or of ribeye area and back fat. However, none have addressed the complete picture of production methods, genetic replication, economic efficiency, and marketing targets of consistent quality in differing marketing groups or levels and traced the data back to the individual cow and bull in a herd to a total system that is sensitive to changes in consumer demands.

In view of the above described prior art, a need exists for an improved method of managing cattle production by the cattle producer. Likewise, a need exists for an improved method of tracking and evaluating the genetic development and replication of beef cattle to improve management of cattle herds, improve beef quality and increase investment returns on cattle for the cattle producer.

SUMMARY OF THE INVENTION

The present invention relates to an improved cattle management system and method which increases the carcass value at sale by selective breeding and physical maintenance programs designed to improve the consistent beef quality of the herd and improving the overall profitability of each individual member of the cattle herd by using a holistic approach where all economically important traits, as well as the growing/processing environment, are considered in the process collectively. The system allows the rancher or cattle producer to collect data on individual cattle, determine and minimize his production costs and evaluate options in marketing at any time from the weaning stage to the final carcass stage.

The primary objective of the present invention is to provide a system and method of cattle selection, management and care which leads to better performance with market goals in mind that is not only traceable to certain individuals, but has the ability to be replicated. This system utilizes a method in which each animal is uniquely identified and allocated performance and economic data, which is recorded and traced back to the cow and bull pairing that produced the individual calf which allows the cattle producer to make informed management decisions based on the target market in which the cattle producer desires his cow herd to perform.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
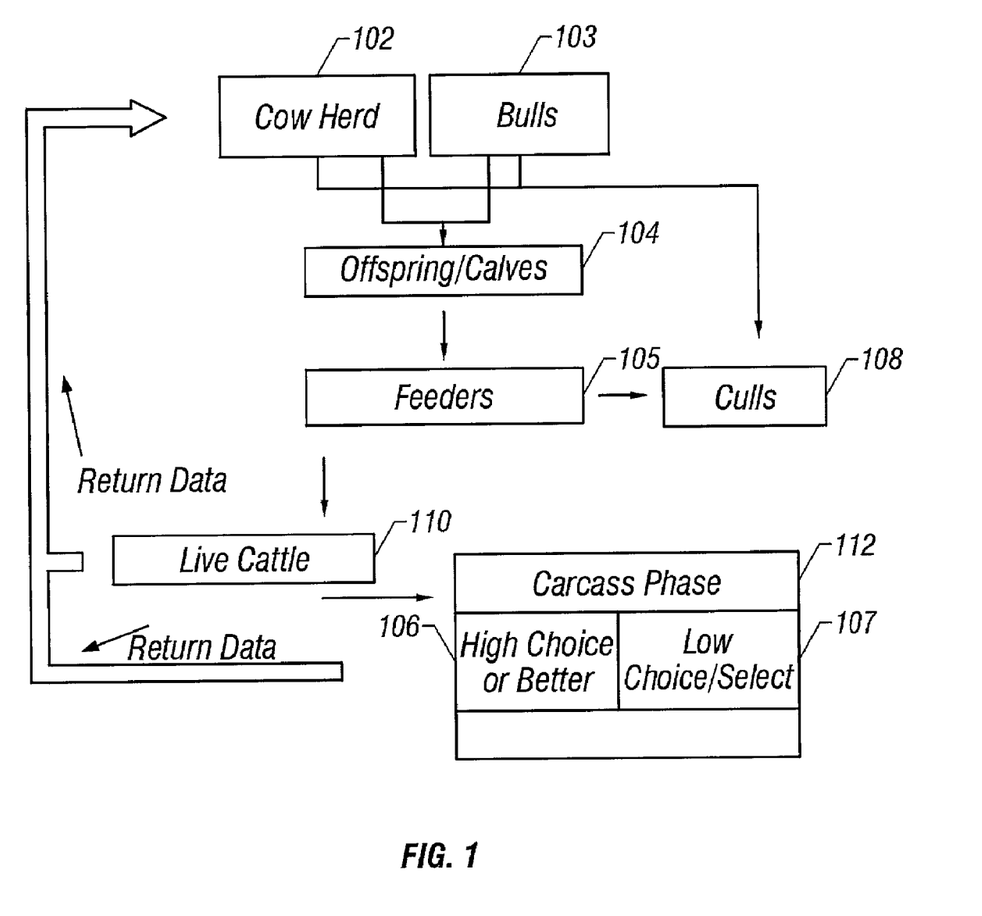
FIG. 1 is a flow chart depiction summarizing the first collection of data and overall method of improving and maintaining the cowherd characteristics and traits by utilizing the invention disclosed herein.

Turing to FIG. 1, the method by which a cowherd 102 is selected and refined for improved physical and beef producing characteristics is shown. The cowherd 102 population is mated to selected bulls 103. The cows 102 and bulls 103 are selected by using actual and/or EPD data for desirable traits, which further the goal of the intended market level. Some of the important traits are fertility, birth weight, environmental suitability and efficiency. The offspring/calves 104 are then processed when the youngest calf 104 is no younger than 60 days old. Cows 102 and calves 104 are rounded up and brought in to a contained area called working pens. Cows 102 and calves 104 are separated into different holding pens. Cows 102 are then treated for external and in some areas internal parasites, checked for proper identification tags, which are replaced if, needed due to loss or unreadable numbers and overall checked for any physical problem(s) that needs attention. The cows 102 are then placed into a pen located adjacent to the pen the calves 104 are to be processed. Then the calves 104 are processed individually in the following minimum standard manner: A brand is placed in the proper Beef Quality Assurance location and manner, vaccination with a chemically altered vaccine type is done for certain diseases and killed types of vaccines for others depending on the disease vaccinated against. Bulls are castrated and each calf 104 is given both an electronic identification tag as well as a visual identification tag. However, the electronic identification at this stage is optional. As each calf 104 is processed, the calf 104 is allowed to return to its mother 102. After all the calves 104 have been processed and the cows 102 have had some time to find their calves 104, the cows 102 and calves 104 are released back to the location desired by the cattle producer.

From this time to weaning, the cattle producer matches up which cow 102 and which calf 104 go together, called pairs. A tally list is usually kept to prevent recording repeats of the same pairs and so that the cattle producer can take the data an input it into a database for future reference. The cattle are then checked from time to time for about 6 months.

After approximately 6 months or when the calves 104 are about 50% of the body weight of the cows 102, the cows 102 and calves 104 are again gathered into holding pens and separated. At this stage of production the calves 104 are then weighted individually and again processed in the following manner as referenced by the National Cattleman's Beef Association or Texas Beef Quality Producer criteria, vaccines are given in modified live form for various diseases, treatment for external and internal parasites is given and if not done earlier an Electronic Identification Tag is inserted. The calf's 104 data is recorded in a manner, which reflects the type of vaccination, location of vaccination on the animal, weight and Visual Identification Number as well as a correlated Electronic Identification Number.

After the processing of the weaned calves 104, they are transferred to holding pens usually in a central area for feeding purposes for about 10 days, and after that are then turned out on grass or wheat or some other high protein feed for a minimum of 35 days more. This process is sometimes called VAC-45, where the cattle are held for at least 45 days after vaccination before moving the cattle to distant locations. This allows the vaccines to take effect and reduces stress on the calves 104. The cows 102 are then processed after the calves 104 are processed. Each cow 102 is individually weighed and looked over to determine again if any physical needs should be tended to. The cows 102 are also treated for both internal and external parasites as well as given any vaccinations that are deemed necessary at the time. The cows 102 are then released to whatever location the cattle producer deems prudent for the best interest of the cow herd 102.

Upon the completion of the 45 day period, the calves 104 now called feeders 105 or yearlings are at their lowest economic efficiency, where costs are in most cases higher than revenues if sold. Never the less, the feeders 105 can be sold on the cash market by the cattle producer. However, for most economic gains they are usually placed on grass or wheat if available, for a period of time that it takes the calves to gain enough weight to reach the 750 to 800 pound range. At the end of this stage of production, the feeders 105 are then shipped to a feedlot. It is during the stage that replacement heifers are retained, based on previous data history of that individual's dam for introduction into the cow herd 102 when they are at mature breeding age (normally two years old). It should be noted that this stage of production known as the feeder phase 105 could terminate at any point after the 45-day period has been completed, depending of availability of wheat or grass and or other concerns both economical and environmental. Prior to shipping to the feedlot, feeders 105 are sorted into groups that correlate with USDA quality grades of Beef, namely Choice or better 106, Low Choice/Select 107 and non-graded culls 108, based on prior data where available and within each group by weight in increments of 100 pounds or less. Where prior data is not available such as in the first year's data pass, known performance probabilities of certain genetic lines are used, based on actual data and/or Estimated Progeny Differences known as "EPD's" of cows 102 and bulls 103. The culls 108 are grouped due to poor performance, phenotype, deformities, size/weight, health, as well as a host of other considerations.

Figure 2:
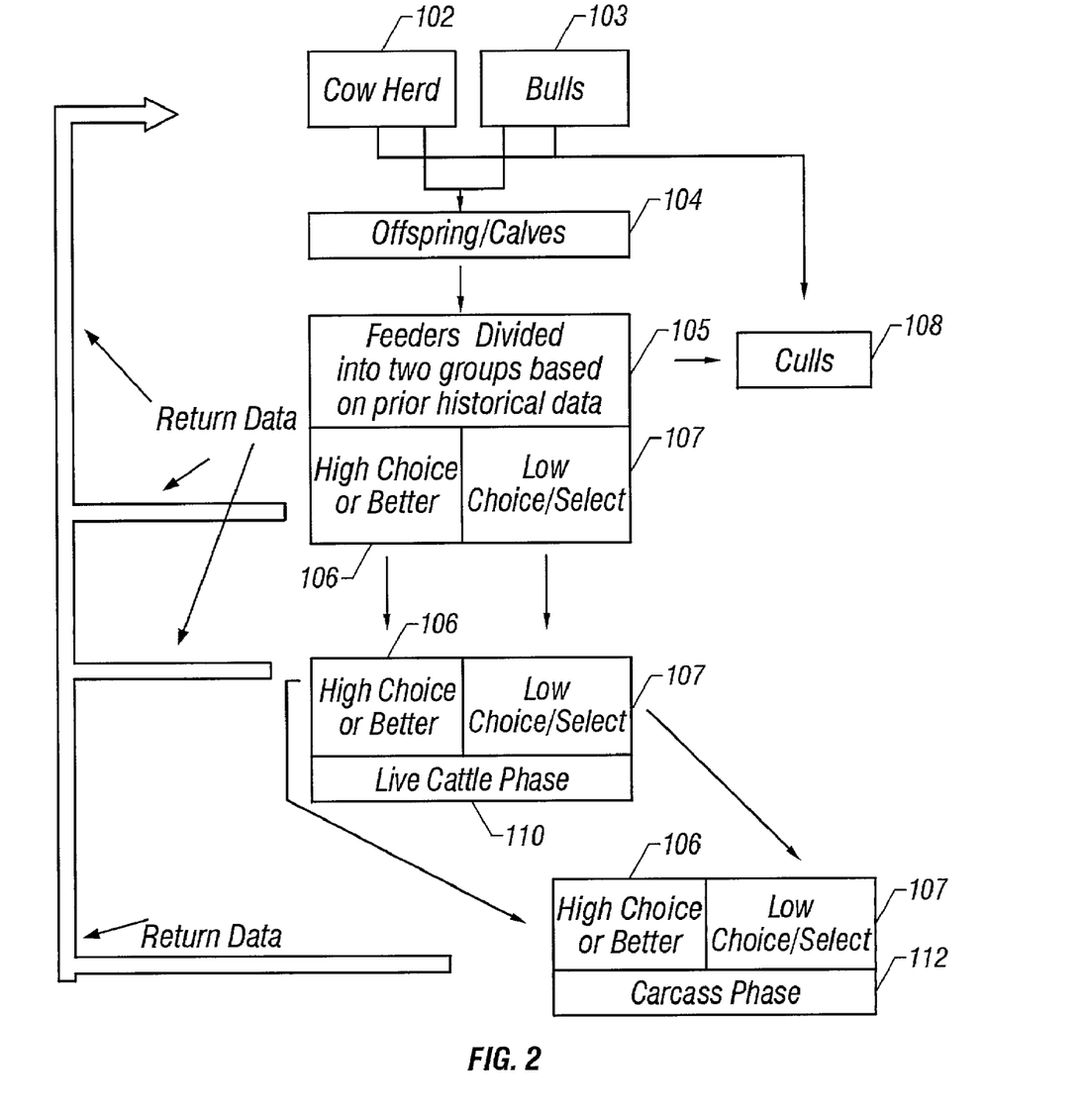
FIG. 2 is a flow chart diagram setting forth the method and system of cowherd management for achieving improved beef quality, herd physical characteristics and increased economic profitability based on the collection of the previous history of data.

At this stage of production as shown in FIG. 2, the economic, genetic and performance data now link individuals in specific groups to individual cows 102 and bulls 103. From this point of production to the end of production at the carcass level the data becomes easier to acquire and more complete and accurate. This data includes culls 108, and close attention is then paid to the reasons for the culls 108. If a genetic link can be made the individual cow 102 or bull 103, then that individual is then also placed in the group of culls 108. In the case of the culls 108 each individual is marketed to a market that returns the highest possible returns unless health problems prevent marketing due to condemnation of the carcass.

The beginning of the live cattle phase 110 is when the feeders 105 are shipped to a feedlot. At this point, two things happen, first, the live cattle 110 are converted from an animal that eats mainly cellulose to an animal that eats mainly starch. Second, the data on all economic measurements are easily captured due to the confined environment and controlled inputs.

Live cattle 110 are processed by; retrieving individual weights, tagging for lot number identification if not already done at an earlier stage and sorted by sex and into groups that are 50 to 100 pound ranges upon entrance to the feedlot. Data again is entered by visual or electronic identification and match up to past data to continue a data history of each individual animal which traces back to create a historical report of what each cow 102 has produced. At the end of this stage of production is when the live cattle 110 are marketed to targeted market grids. The Choice or better 106 group is marketed on a grid that that optimizes economic returns and matches the predicted carcass performance of USDA grade choice or better. The Low Choice/Select group 107 likewise marketed to a grid that optimizes economic returns and matches the predicted carcass performance of USDA grade Low Choice or Select.

The next phase of production, the live cattle 110 are marketed to targeted market grids. Upon completion of harvest by the packer, individual carcass 112 return data is then broken down into economic important measurements. These measurements include: Back fat, ribeye area, Kidney/pelvic/heart fat measurements, hot carcass weight, dressing percent, yield grade, quality grade, and marbling score. Economic data includes: price per pound for each USDA grade and yield grade division, premiums and discounts, and other service charges and/or bonus revenue. This carcass 112 data along with the final closeout data and analysis which includes days on feed, average daily gain, dry matter conversion, in weight, and out weight, as well as final cost of feeding and services from the feedlot during the live phase 110 of the production is returned to the cattle producer for integration into the data history in each individual animal produced and this data history is then linked to each individual cow 102 and bull 103.

This data and production process stream is then repeated for the next breeding and production season to more refine the next set of offspring 104 which is again linked back to the individual cow 102 and bull 103 to create a historical data stream for each individual cow 102 and bull 103. However, each data pass the starting population of cows 102 and bulls 103 is now altered to reflect changes due to return data from prior calves 104 history of prior breeding and production seasons. This allows the cattle producer to change combination and market targets for individual cows 102 and bulls 103 and their calves 104, or do away with the genetic line altogether by placing them in the cull group 108. Also, as data is compiled on each individual cow 102 and bull 103, each animal's data history makes production from certain combinations more predictable each time and allows individual cows 102 to be grouped into targeted market herds 115, where the performance, and economic returns are highly predictable for the calves 104 at any level of production from weaning as feeders 105 to the final phase or stage of production at the carcass level 112.

Figure 2A:
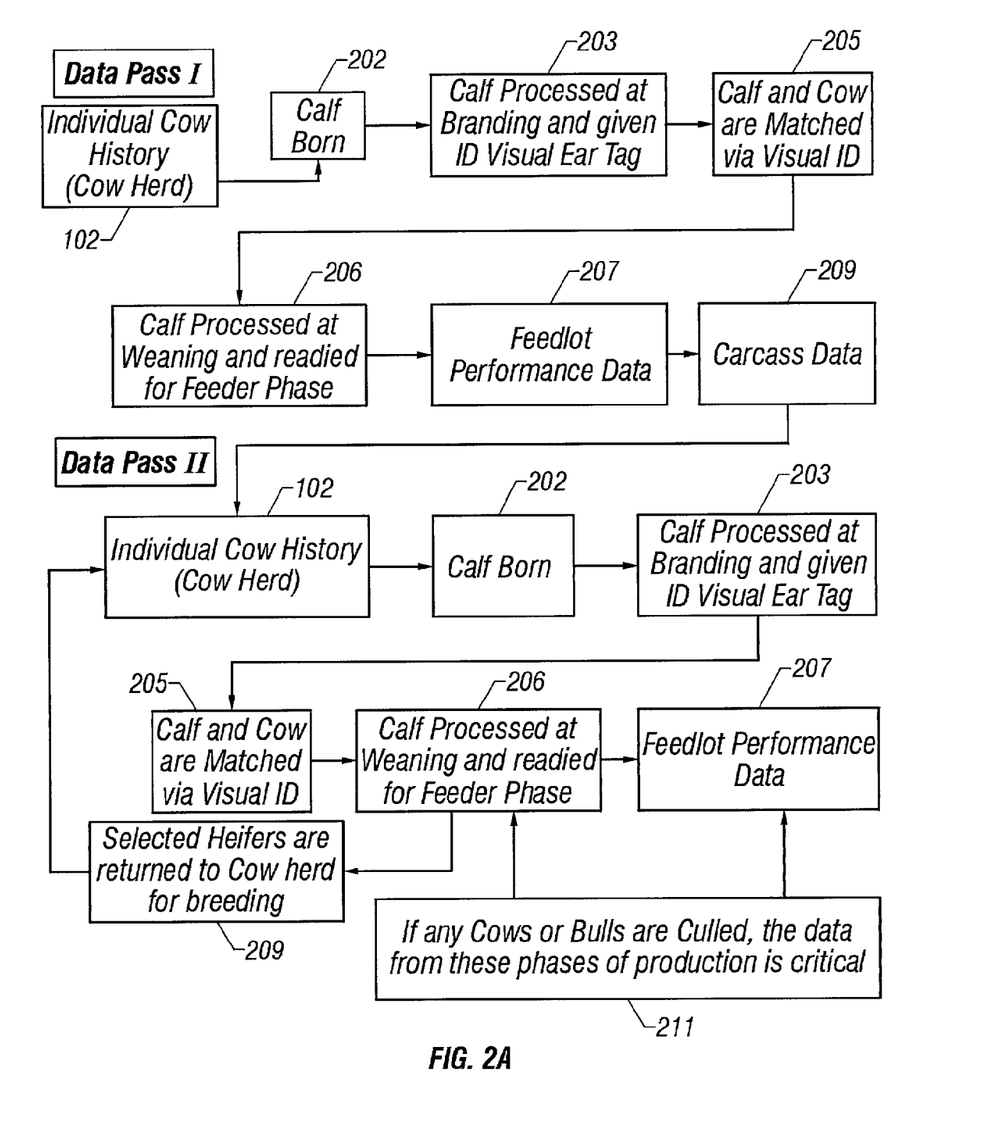
FIG. 2A is a flow chart depiction of the data collected and returned on calves participating in the cowherd management system disclosed herein showing the data collected during each phase of production on a repeated basis.

FIG. 2A depicts a typical data collection process during the different phases of production which provides for the determination of and selection of bulls, cows and calves with desirable characteristics for improving the overall cowherd in terms of genetic lineage, production benefits and profits. Initial base line data is collected on the individual cows in the population 102. After the mating season is complete, calves are born 202 and processed 203 which includes branding and ear tagging with either a visual and/or electronic identifier. The cows and calves are then paired and matched with the visual and/or electronic identifier assigned to each cow and calf 205. The calves are again processed at weaning and readied for the feeder phase of production 206. Each individual calves' feeder production data is recorded with respect to each calf 207. After slaughter, the carcass data is recorded with respect to each feeder 209. The calf, feeder and carcass data for each cow's offspring is then analyzed with respect to each cow and the cycle data pass cycle is then repeated. By analyzing the production characteristics of a calf's mother, the cattle manager may make informed production decisions and cull out cows which do not produce offspring which produce quality calves of a desired yield and/or quality.

Figure 2B:
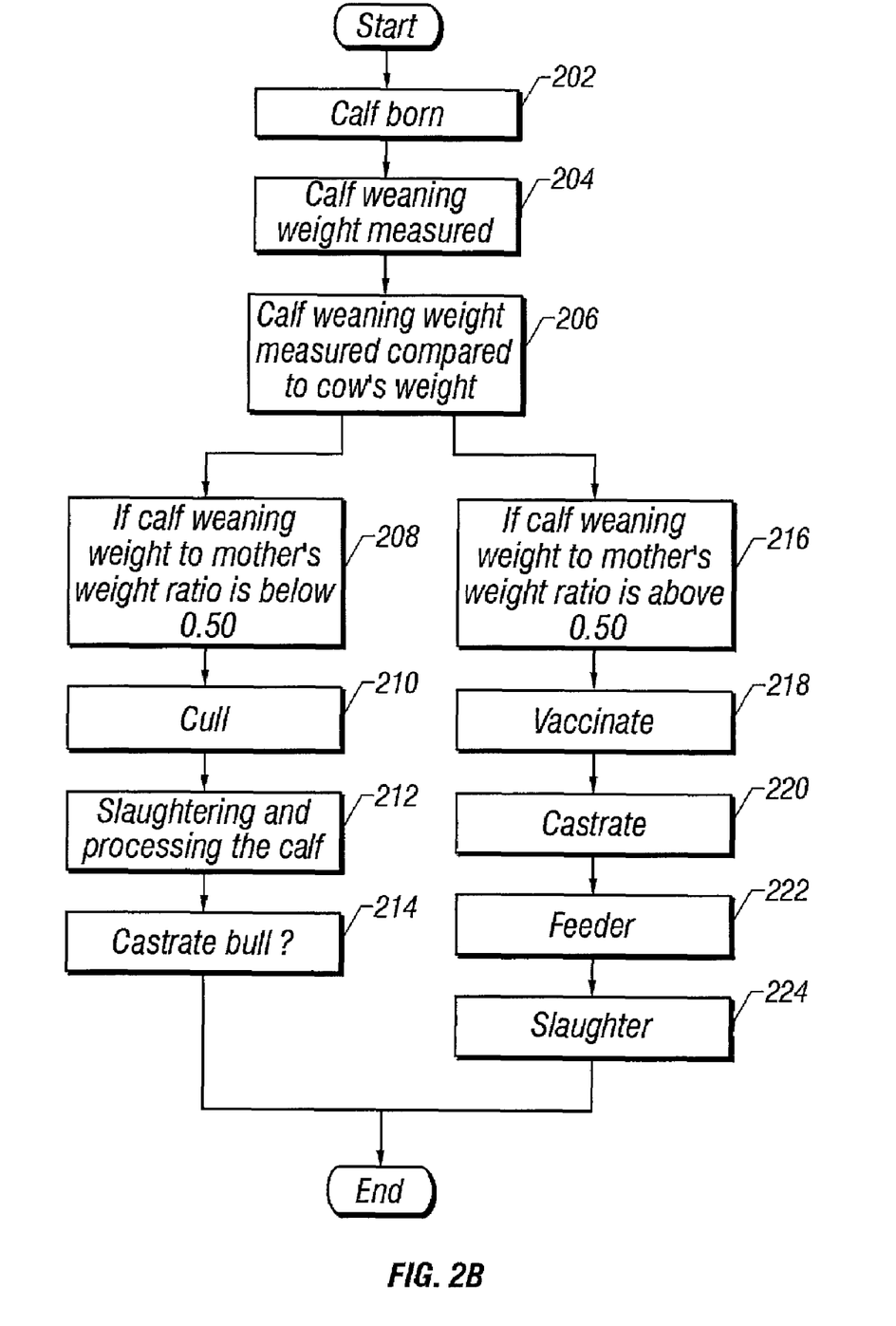
FIG. 2B is a flow chart depiction of the process wherein the calf is selected as a cull or feeder based on the calf weaning weight to cow weight ratio.

FIG. 2B represents another depiction of the feeder 105 or cull 108 determination made with respect to the ratio formed between the calf weaning weight compared with the mother's weight at weaning. Initially, the calf is born (Step 202) as previously discussed herein. After approximately 6 months or when the calves 104 are about 50% of the body weight of the cows 102, the cows 102 and calves 104 are again gathered into holding pens and separated. At this stage of production, the calves 104 are then weighed individually and again processed in the following manner as referenced by the National Cattleman's Beef Association criteria, vaccines may given in modified live form for various diseases, treatment for external and internal parasites is given and if not done earlier or later, and an Electronic Identification Tag is inserted. The calf's 104 physical and processing data is recorded in a manner, which reflects the type of vaccination, location of vaccination on the animal, weight and Visual Identification Number as well as a correlated Electronic Identification Number (Step 204). The calf's weaning weight is then divided by its mother's weight (Step 206). In the shown embodiment, if the ratio of the calf's weaning weight is less than 50% of the calf's mother's weight (Step 208), the calf is determined to be a cull (Step 210), then slaughtered and processed (Step 212). Likewise, the bull that produced the calf may then be castrated to prevent future breeding by the bull in order to reduce the possibility of diluting the genetic lines with lower grade calves (Step 214). Alternatively, if the calf's weaning weight to mother's weight ratio is equal to or greater than 50% (Step 216), the calf is vaccinated if not done earlier (Step 218), castrated if not raised for breeding purposes (Step 220), designated as a feeder and sent to a feedlot for weight gain (Step 222), and then slaughtered (Step 224). In this embodiment, the calf weaning weight to cow weight ration is determinative as to whether the calf if graded as a cull or feeder.

Figure 2C:
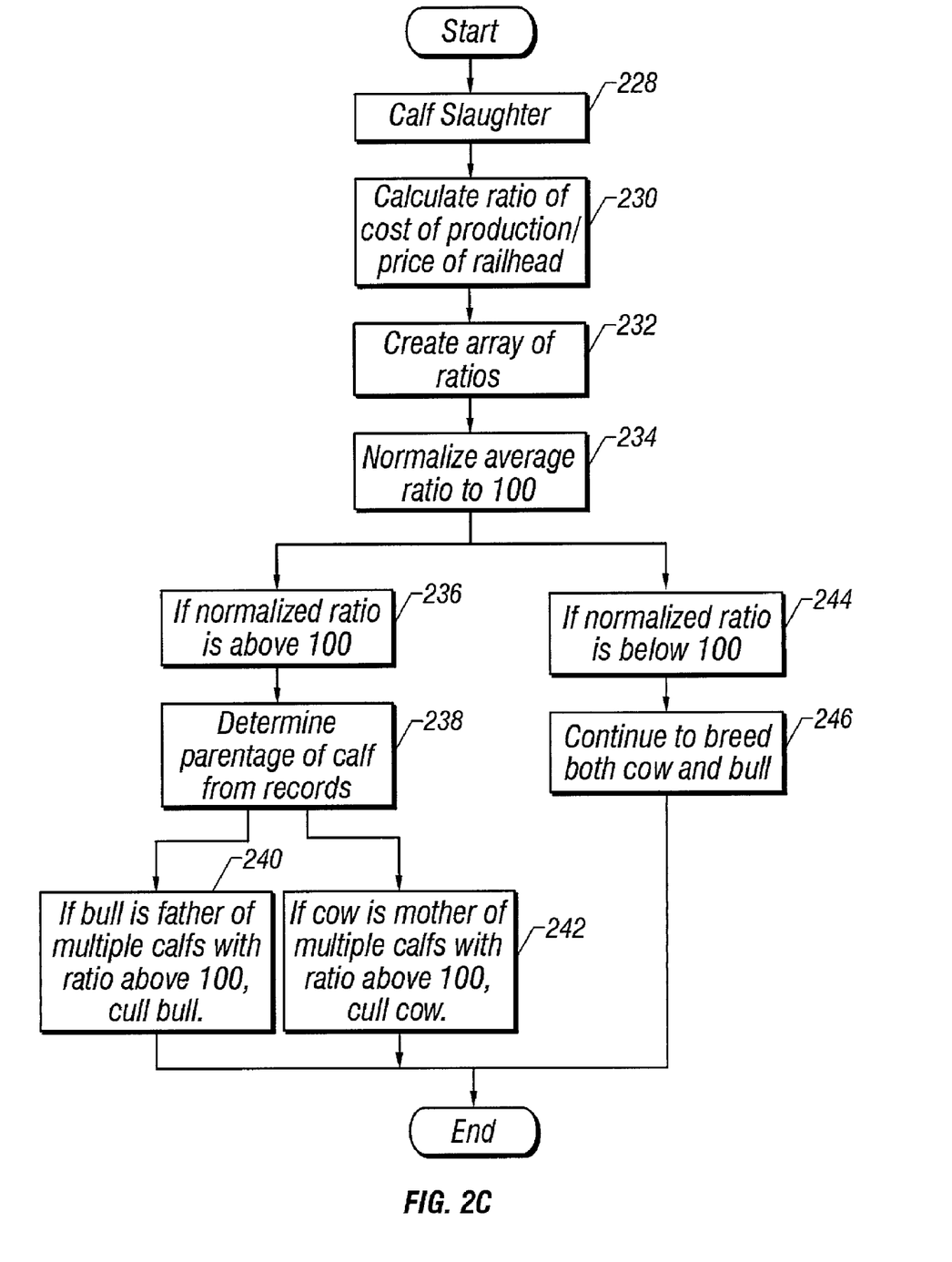
FIG. 2C depicts an alternative process wherein the production cost and profits associated with a particular genetic line determines whether a breeding pair is culled or maintained as a breeding unit.

FIG. 2C is a flow diagram which illustrates an alternative process by which the genetic quality of calves produced for beef production is selected and maintained. A feeder calf is slaughtered (Step 228) and the ratio of the costs associated with the production of the calf versus the price of the calf at the "railhead" (i.e. being sold to the beef processor) is calculated (Step 230). An array of ratios is created by the cattle producer (Step 232) for each of the calves slaughtered. The ratios are then normalized to a predetermined value, in this example the value is 100 (Step 234). If the normalized ratio results in a figure above 100 (Step 236), the parentage and genetic lineage of the calf is identified (Step 238) from the recorded calf data records as discussed in FIGS. 1 and 2. If it is determined that the calf's father has sired multiple calves with normalized ratios exceeding 100, the bull is then culled and processed for slaughter (Step 240). Likewise, if the calf's mother has borne multiple calves with normalized ratios exceeding 100, the cow is culled and processed for slaughter (Step 242). In contrast, if the normalized ratio is below 100 (Step 244), the calf's sire and mother are retained as a breeding pair for the next season (Step 246).

Figure 3A:
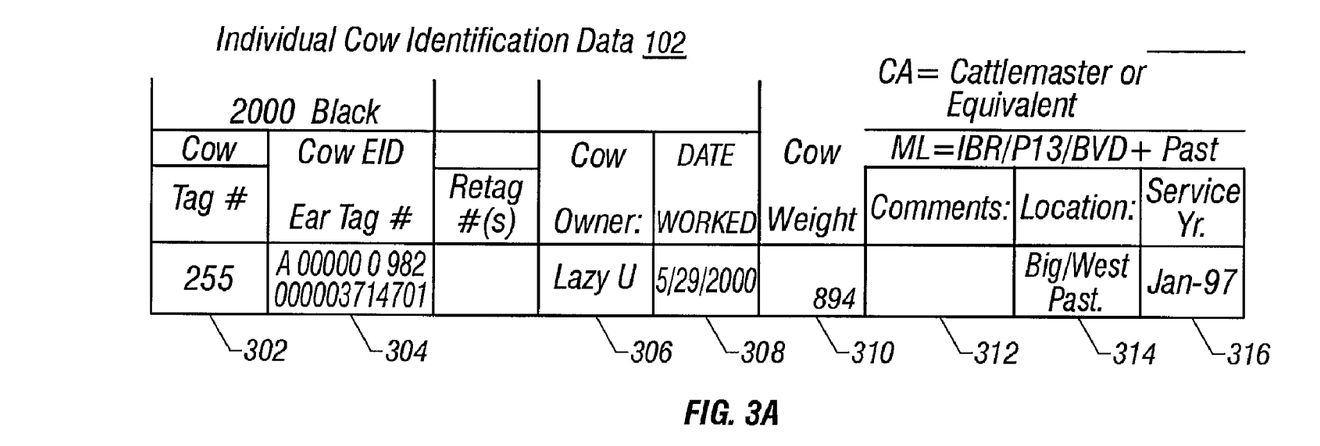
FIGS. 3A-3E are data tables representing the collection of actual performance and economic data returned on each individual in the cow herd and the data returned from each phase of production of the calf showing relative values participating in the method disclosed herein.

FIGS. 3A-3E are representative data which are collected on each member of the herd during processing. FIG. 3A contains the data collected for live cow 102 identification. The data gather on each cow 102 includes the Cow Visual Identification Number 302 and Cow Electronic Identification Number 304 which may be stored within the cow ear tag number and electronically accessed by means known in the art. The owner of the cow 102 is noted in column 306 the date the cow 102 was last processed is noted 308. The Cow Weight 310 is measured at the time of weaning so that a ratio may be determined to establish whether the cow 102 produces above or below the average of the cow herd by measuring the actual body weight produced each season. Individual comments 312 and Cow Location 314 data are recorded as observed. The Service Year 316 represents the date or year the cow 102 is placed into the breeding herd. This allows the cattle producer to know the actual ages of the cows 102 in the herd and make informed decisions on managing the age of the herd for maximum herd health and economic return.

Figure 3B:
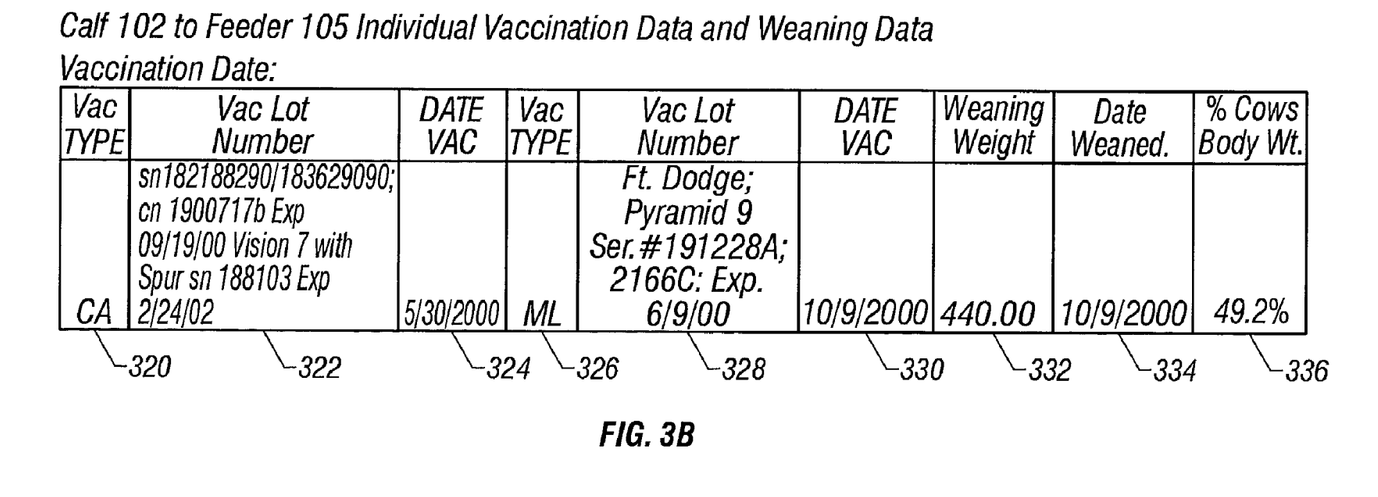

FIG. 3B represents typical data recorded on each calf 104 through development to the feeder 105 stage of production. The Type of Vaccine 320 administered to each calf is noted. These vaccines may include Chemically Altered (CA), Killed (K), or Modified Live (ML) vaccines. The date each calf 104 is vaccinated is recorded 324. The Vaccine Lot Number 322 is recorded which includes each administered vaccine's serial number, lot number and expiration date. Vaccination data attributable to difference vaccines given according the vaccination schedule are recorded as shown 326, 328, 330. The Weaning Weight 332 of each calf 104 is noted along with the Weaning Date 334. Next, the Percentage of the Cow's Body Weight Produced at Weaning 336 is determined by the cow's 102 weight divided by each calf's 104 weight at weaning.

Figure 3C:
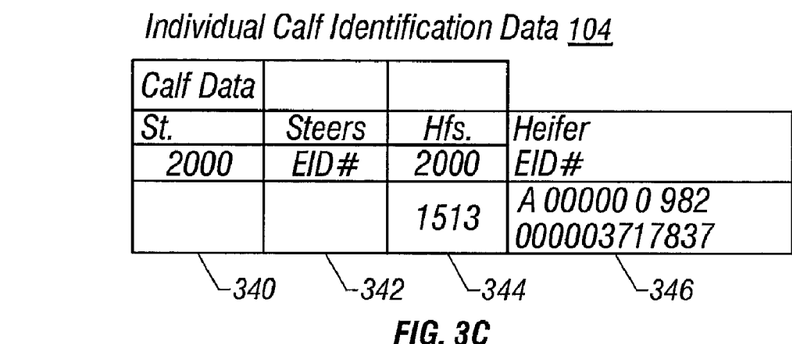

FIG. 3C depicts the data collected and monitored on each individual calf 104 during production. The Year of Production 340 is noted along with each steer's Electronic Identification Number 342. The same data is recorded for each heifer 344, 346.

Figure 3D:
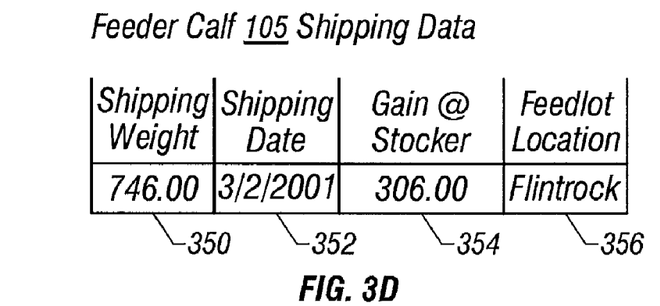

FIG. 3D contains data concerning each feeder calf's 105 shipping data. The Shipping Weight 350 and Shipping Date 352 represent the weight of the calf 105 when shipped to the Live Phase of production to the feedlot, respectively. The Gain at Stocker 354 is the weight gain of the calf 105 during the feeder phase of production. The Feedlot Location 356 represents the feedlot to which the feeder calf 105 is shipped for Live Production 110.

Figure 3E:
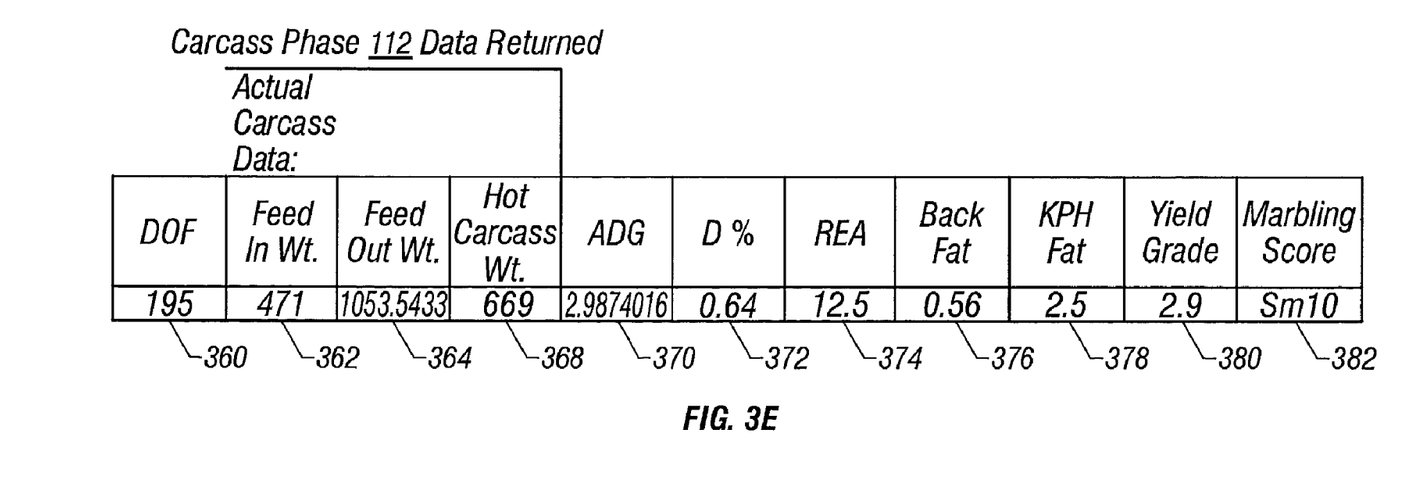

FIG. 3E sets forth the data recorded during the Carcass Phase 112. The Days on Feed (DOF) 360 of each Live Cattle 110 is calculated as the number of days the Feeder 105 is fed at the feedlot until the day the Feeder 105 is sent to the beef packer for processing. The Feed In Weight 362 is determined as the actual arrival weight of the feeder 105 at the time it is placed in the feedlot. The Feed Out Weight 364 is the actual weight of the feeder 105 at the time it is removed from the feedlot for shipment to the beef processor. The Hot Carcass Weight 368 is measured after processing by the beef packer. The Average Daily Gain 370 is calculated by subtracting the Feed In Weight 362 from the Feed Out Weight 364 and dividing the difference by the Days On Feed 360. A Dressing Percentage 372 is calculated and the Ribeye Area (REA) 374, Back Fat 376 and Kidney/Pelvic/Heart Content (KHP) 378 of each individual carcass is measured and recorded during processing by the beef packer. The Actual Yield Grade 380 is then determined on a scale of 1 through 5 where a ranking of 5 designating a high fat and low red meat content. The Actual Yield Grade (YG) 380 is calculated according the formula:

$$YG=2.5+(2.5 \times \text{Back Fat})+(0.2 \times KHP)+(0.0038 \times \text{Hot Carcass Wt.})-(0.32 \times REA)$$

The Marbling Score 382 is determined from the measured intramuscular fat content of the carcass which is contained in the ribeye between the $12^{th}$ and $13^{th}$ rib. This score determines the quality grade of each carcass, which is measure in 100 point increments and ranked as follows: Prime=Abundant (Ab), Slightly Abundant (SLA), Moderate (Mt); Choice=Modest (Md); Small (Sm); Select=Slight (Sl); Standard=Traces. A Prime grade represents the highest quality beef product.

Figure 4A:
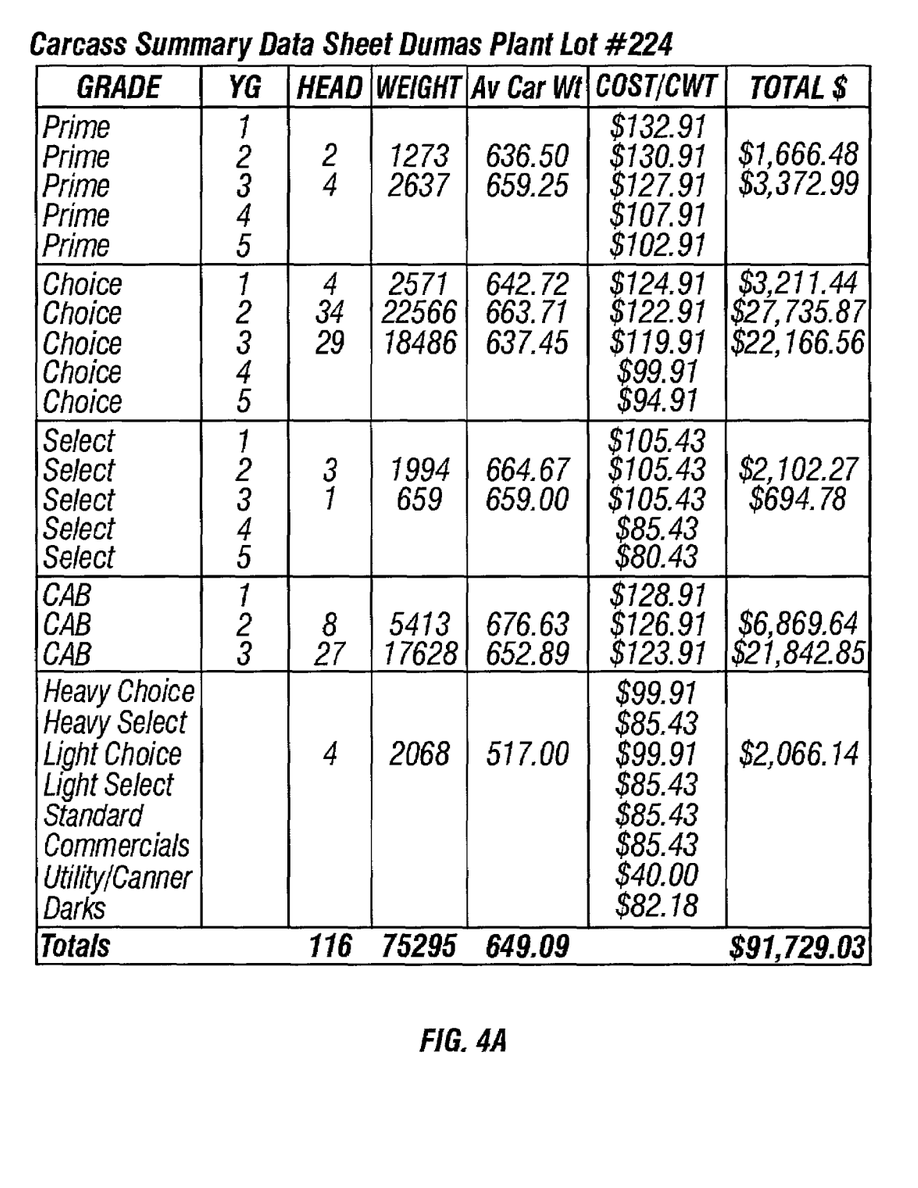
FIGS. 4A and 4B are examples of an actual chart setting forth a marketing grid of the calculated grades with premiums and discounts for a targeted base market of choice/yield grade 3 associated with a cow herd consisting of 116 heifers showing relative values participating in the method disclosed herein; and, FIG. 5 depicts an alternative embodiment of the invention disclosed herein which provides a cattle producer with the ability to identify and track a meat product from conception to consumption.
Figure 4B:
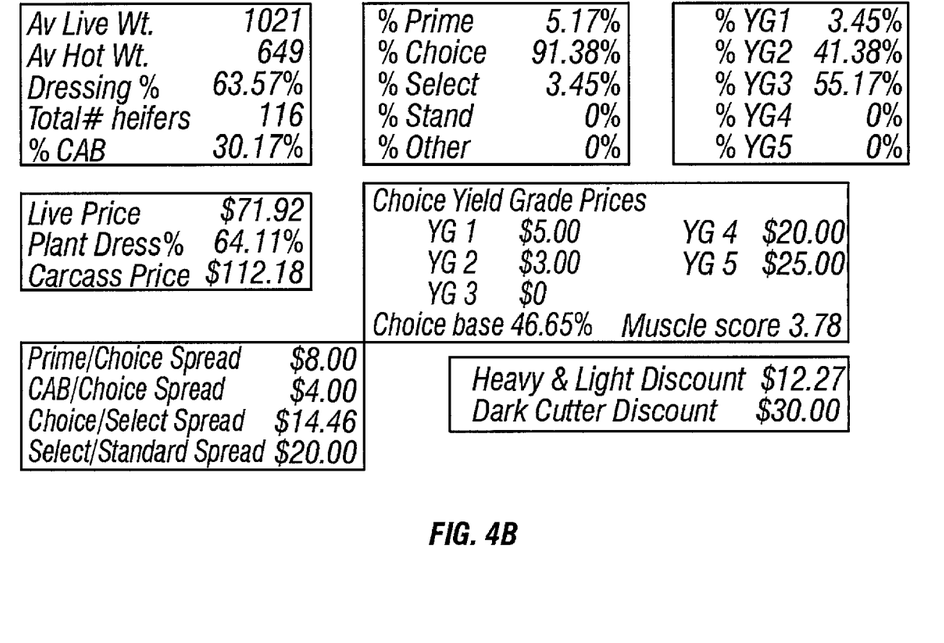

FIGS. 4A and 4B is a representative example of a Carcass Payment and Discount Grid which sets for the exemplary values, scores and statistics for 116 head of cattle produced by the method discussed herein. From the data shown in the Grid, 5.17% of the cattle processed were of Prime quality, 91.36% were rated as Choice, and 3.45% were rated as Select. Based on these values and the data obtained during production as shown in FIGS. 3A-3E, the genetic lines of the animals processed are identified and compared to the processing grade of each cow's 102 ancestors allowing the cattle producer to make informed breeding and production decisions based on the profitability of that cow's genetic lineage.

Figure 5:
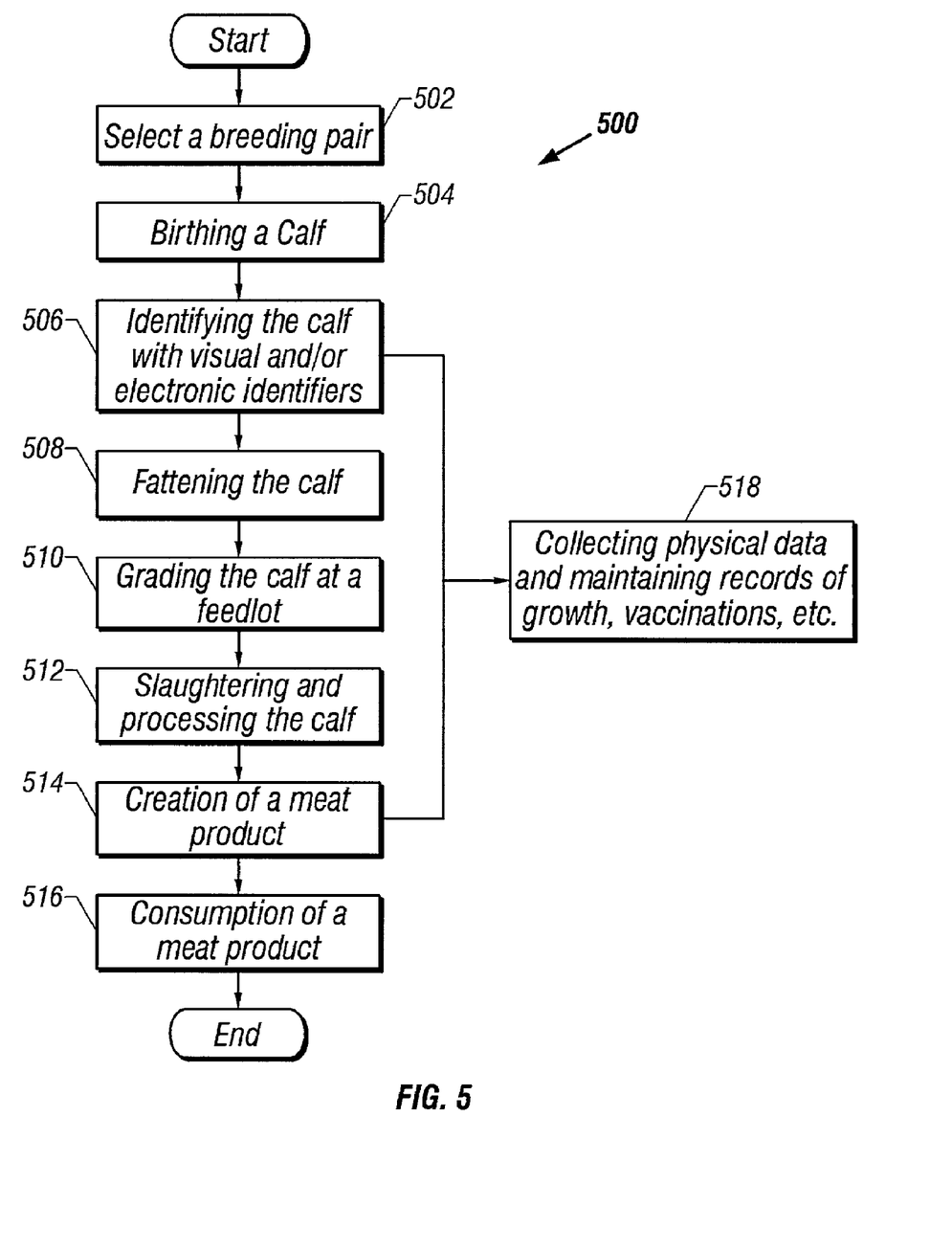

With reference to FIG. 5, a flow chart depicting an alternative embodiment of the invention disclosed herein is shown. Initially, the cattle producer may select a breeding pair to produce a calf projected at achieving a predetermined target market (e.g. Prime grade for meat production) (Step 502). Next, the calf is born (Step 504) and identified with a unique visual identifier (e.g. a brand) or an electronic identification device (e.g. an electronic ear tag) (Step 506). The calf is then placed into the cattle producer's production plan as a feeder and sent to a feedlot for weight gain (Step 508). After a predetermined period of time or an optimal weight is reached by the calf, the calf is sent to a beef packer for processing and graded (Steps 510 and 512). The meat is then packaged by the beef packer (Step 514) and, ultimately, the meat product is consumed (Step 516). During the production phase of the calf (Steps 506-514), data is collected on the calf such as weight, owner and feedlot location and affiliated with the unique identifier given to the calf at birth (Step 518). This method provides a method by which a consumer may identify and locate the cattle producer, feedlot and beef packer which were involved in the production of the meat product consumed by the consumer as a source of a quality product or, alternatively, in the event the meat product causes a detrimental effect on the health of the consumer.

While the invention has been shown in only one of its forms, it should be apparent to those skilled in the art that it is not so limited, but is susceptible to various changes without departing from the scope of invention. Accordingly, it is intended that the appended claims encompass any alternative embodiments of the invention not disclosed herein that are within the ordinary skill of a person knowledgeable in the art.

What is claimed is:

1. A method of managing a cow herd for optimal production comprising:
    identifying a calf in a cow herd;
    matching said calf to a cow in said cow herd:
    collecting an initial set of data on the calf;
    assigning said calf a quality grade, wherein said quality grade reflects a correlation of said calf's initial set of data with a model data;
    selecting the said calf as a feeder calf or a cull based on said quality grade;
    linking said quality grade to said cow and a bull; and
    determining whether to cull said cow or said bull based upon said quality grade.

2. The method of claim 1 wherein the identification of said calf comprises at least one of visual identification or electronic identification.

3. The method of claim 1 wherein the collection of said initial data includes at least one of ear tag number weight, location, service year, vaccination type, vaccination lot number, vaccination date, weaning weight, weaning date and percentage of cow's body weight.

4. The method of claim 1, wherein said model data is based upon the genetic lineage of the calf.

5. The method of claim 1, wherein said model data is based upon an historic genetic line performance probabilities of said calf.

6. The method of claim 1, wherein said model data is based upon an historic data of said cow.

7. The method of claim 1, wherein said model data is based upon an historic data of said bull.

8. The method of claim 1 wherein said model data is based upon an estimated progeny differences of said cow.

9. The method of claim 8, wherein the collection of said feeder data on said feeder calf includes at least one of shipping weight, shipping date, gain at stocker and feedlot location.

10. The method of claim 8, at wherein the collection of said carcass data on said feeder calf includes at least one of days on feed, feed in weight, feed out weight, hot carcass weight, avenge daily weight gain, dressing percentage, ribeye area (REA), back fat, kidney/pelvic/bean content (KHP), yield grade and marbling score.

11. The method of claim 10, wherein the yield grade is computed in accordance with a formula which correlates the back fat, KHP, hot carcass weight and REA of said feeder calf.

12. The method of claim 11, wherein said yield grade equals 2.5+(2.5×back fat)+(0.2+KHP)+(0.0038×hot carcass weight)−(0.32×REA).

13. The method of claim 8, wherein the step of selecting said feeder calf for target market grid includes a statistical numerical analysis of the said feeder calf's feeder data and a determination of the economic costs and gains associated with the production of the feeder calf.

14. The method of claim 8, wherein the step of selecting said feeder calf for target market grid includes a predetermined yield grade.

15. The method of claim 8, wherein the step of selecting said feeder calf for target market grid includes a predetermined quality grade.

16. The method of claim 8, wherein the carcass data on said feeder calf includes at least one of a predetermined shipping weight, days on feed, feed in weight, feed out weight hot carcass weight, average daily weight gain, dressing percentage, ribeye area, back fat, kidney/pelvic/heart fat, and marbling score.

17. The method of claim 8, wherein the step of selecting said feeder calf for target market grid includes an analysis of the genetic lineage of the feeder calf.

18. The method of claim 1, wherein said model data is based upon an estimated progeny differences of said bull.

19. The method of claim 1, further comprising:
collecting a feeder data on said feeder calf;
selecting said feeder calf for a target market grid based upon said feeder data; and
harvesting said feeder calf; and
collecting a carcass data on said feeder calf.

20. The method of claim 19, further comprising updating said model data with said feeder calf's carcass data.

21. The method of claim 19, further comprising updating historic data of said cow with said feeder calf's carcass data.

22. The method of claim 19, further comprising updating historic data of said bull with said feeder calf's carcass data.

* * * * *

UNITED STATES PATENT AND TRADEMARK OFFICE
CERTIFICATE OF CORRECTION

PATENT NO. : 7,278,373 B2  
APPLICATION NO. : 10/060616  
DATED : October 9, 2007  
INVENTOR(S) : James Fuqua It is certified that error appears in the above-identified patent and that said Letters Patent is hereby corrected as shown below:

Column 10  
Claim 1, line 9, please delete "the" therefor.  
Claim 10, line 1, please delete "at" therefor.  
Claim 10, line 4, please delete "avenge" and insert --average-- therefor.

Column 11  
Claim 10, line 5, please delete "kidney/pelvic/bean" and insert --kidney/pelvic/heart-- therefor.  
Claim 12, lines 2-3, please delete  
"2.5+(2.5xback fat)+(0.2+KHP)+(p.pp38xhot carcass weight)-(0.32xREA)" and insert --2.5+(2.5xback fat)+(0.2xKHP)+(p.pp38xhot carcass weight)-(0.32xREA)-- therefor.

Column 12  
Claim 16, line 4, please insert a comma between "weight" and "hot."

Signed and Sealed this

Third Day of June, 2008

JON W. DUDAS  
*Director of the United States Patent and Trademark Office*